United States Patent
Kim et al.

(10) Patent No.: US 10,469,713 B2
(45) Date of Patent: Nov. 5, 2019

(54) IMAGE FORMING APPARATUS AND CONTROL METHOD OF THEREOF

(71) Applicant: HP PRINTING KOREA CO., LTD., Suwon-si, Gyeonggi-Do (KR)

(72) Inventors: Kyeong-man Kim, Yongin-si (KR); Hyun-soo Oh, Suwon-si (KR); Seong-wook Han, Yongin-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 31 days.

(21) Appl. No.: 15/410,056

(22) Filed: Jan. 19, 2017

(65) Prior Publication Data

US 2018/0020127 A1  Jan. 18, 2018

(30) Foreign Application Priority Data

Jul. 14, 2016 (KR) .................. 10-2016-0089436

(51) Int. Cl.
*H04N 1/60* (2006.01)
*H04N 1/04* (2006.01)

(52) U.S. Cl.
CPC ............ *H04N 1/6077* (2013.01); *H04N 1/04* (2013.01); *H04N 1/6094* (2013.01); *H04N 2201/0094* (2013.01)

(58) Field of Classification Search
None
See application file for complete search history.

(56) References Cited

U.S. PATENT DOCUMENTS

| 5,587,728 | A | * | 12/1996 | Edgar | ............... | H04N 1/40031 347/19 |
| 6,121,993 | A | * | 9/2000 | Maekawara | ......... | H04N 1/0671 250/205 |
| 6,301,017 | B1 | * | 10/2001 | Suzuki | ............... | H04N 1/40006 358/448 |
| 6,912,306 | B1 | * | 6/2005 | Nakabayashi | ....... | H04N 1/6052 382/167 |
| 7,084,881 | B1 | * | 8/2006 | Chen | .................... | G06T 11/001 345/589 |

(Continued)

FOREIGN PATENT DOCUMENTS

| CN | 101151882 | 3/2008 |
| CN | 101188660 | 5/2008 |

(Continued)

OTHER PUBLICATIONS

International Search Report dated May 22, 2017 in corresponding International Patent Application No. PCT/KR2017/002022.

(Continued)

*Primary Examiner* — Ted W Barnes
(74) *Attorney, Agent, or Firm* — Staas & Halsey LLP

(57) ABSTRACT

An image forming apparatus and method thereof are provided. The image forming apparatus includes: a scanner configured to generate a scan image by scanning a document, a processor configured to generate color information of a medium representing content of the document using a predetermined area of the scan image, and to gamma-correct color of an entire area of the scan image based on the color information, and a printer configured to print the gamma-corrected scan image.

16 Claims, 10 Drawing Sheets

(56) References Cited

U.S. PATENT DOCUMENTS

| | | | |
|---|---|---|---|
| 7,580,168 B2* | 8/2009 | Ikeno | H04N 1/4072 358/1.9 |
| 7,986,447 B2 | 7/2011 | Bang et al. | |
| 8,937,753 B2 | 1/2015 | Lee | |
| 9,665,027 B2* | 5/2017 | Matsuoka | G03G 15/5062 |
| 2002/0057434 A1* | 5/2002 | Ohga | H04N 1/6052 356/406 |
| 2004/0051789 A1* | 3/2004 | Horita | H04N 5/262 348/222.1 |
| 2004/0051794 A1* | 3/2004 | Horita | H04N 5/262 348/234 |
| 2004/0156076 A1* | 8/2004 | Togami | H04N 1/40062 358/2.1 |
| 2004/0174403 A1* | 9/2004 | Yoshida | B41J 19/147 347/15 |
| 2004/0257601 A1* | 12/2004 | Tomiyasu | G06K 7/0008 358/1.9 |
| 2005/0134881 A1* | 6/2005 | Nishide | G06K 15/02 358/1.9 |
| 2005/0243352 A1* | 11/2005 | Fujiwara | H04N 1/6027 358/1.9 |
| 2005/0280845 A1* | 12/2005 | Hussie | H04N 1/6058 358/1.9 |
| 2006/0188157 A1* | 8/2006 | Kondo | H04N 1/6058 382/167 |
| 2006/0232799 A1* | 10/2006 | Nakatani | H04N 1/6019 358/1.9 |
| 2006/0268346 A1* | 11/2006 | van Os | H04N 1/4095 358/3.26 |
| 2007/0127965 A1* | 6/2007 | Pagan | B41J 3/44 400/61 |
| 2007/0229867 A1* | 10/2007 | Suzuki | H04N 1/6058 358/1.9 |
| 2008/0118172 A1 | 5/2008 | Kim | |
| 2008/0158626 A1* | 7/2008 | Bang | H04N 1/6033 358/518 |
| 2008/0180706 A1* | 7/2008 | Yanagi | H04N 1/6033 358/1.9 |
| 2008/0278766 A1* | 11/2008 | Imine | H04N 1/00795 358/3.28 |
| 2009/0073504 A1* | 3/2009 | Lee | H04N 1/4076 358/461 |
| 2009/0086242 A1* | 4/2009 | Kato | H04N 1/32144 358/1.13 |
| 2009/0147327 A1* | 6/2009 | Murai | H04N 1/6016 358/518 |
| 2010/0060682 A1* | 3/2010 | Akatsuka | B41J 2/2114 347/9 |
| 2010/0202000 A1* | 8/2010 | Gotoh | H04N 1/403 358/1.9 |
| 2011/0141497 A1* | 6/2011 | Willamowski | H04N 1/00408 358/1.9 |
| 2011/0261425 A1* | 10/2011 | Yamaguchi | H04N 1/1017 358/512 |
| 2011/0304863 A1* | 12/2011 | Shibuya | H04N 1/6033 358/1.9 |
| 2011/0310446 A1* | 12/2011 | Komatsu | H04N 1/6011 358/518 |
| 2012/0147397 A1* | 6/2012 | Kawamoto | H04N 1/6033 358/1.9 |
| 2013/0004066 A1 | 1/2013 | Butler et al. | |
| 2013/0155427 A1* | 6/2013 | Ichihashi | H04N 1/60 358/1.9 |
| 2013/0250344 A1* | 9/2013 | Merriam | G06F 3/1208 358/1.15 |
| 2014/0177010 A1* | 6/2014 | Lee | H04N 1/00798 358/474 |
| 2014/0362389 A1* | 12/2014 | Namiki | G06K 15/1878 358/1.9 |
| 2015/0022830 A1* | 1/2015 | Kwak | G06K 15/021 358/1.6 |
| 2016/0044211 A1* | 2/2016 | Yamaguchi | H04N 1/6072 358/2.1 |
| 2016/0282183 A1* | 9/2016 | Kanai | G01J 3/027 |
| 2016/0303878 A1* | 10/2016 | Andrea Tallada | H04N 1/6097 |
| 2017/0227904 A1* | 8/2017 | Matsuoka | G03G 15/0121 |

FOREIGN PATENT DOCUMENTS

| | | | |
|---|---|---|---|
| CN | 105829114 | 8/2016 | |
| JP | 2000-92340 | 3/2000 | |
| JP | 2001-77990 | 3/2001 | |
| JP | 2001189874 A * | 7/2001 | G06K 15/02 |
| JP | 2002-171388 | 6/2002 | |
| JP | 2003-271017 | 9/2003 | |
| JP | 2003271017 A * | 9/2003 | |
| JP | 2010-136249 | 6/2010 | |
| JP | 2011176461 | 9/2011 | |
| JP | 2011-234034 | 11/2011 | |
| JP | 2014241503 | 12/2014 | |
| KR | 100739731 | 7/2007 | |
| KR | 10-2008-0061738 | 7/2008 | |
| KR | 10-2014-0082435 | 7/2014 | |
| KR | 10-2015-0010045 | 1/2015 | |

OTHER PUBLICATIONS

Written Opinion of the International Searching Authority dated May 22, 2017 in corresponding International Patent Application No. PCT/KR2017/002022.

* cited by examiner

IMAGE FORMING APPARATUS AND CONTROL METHOD OF THEREOF

CROSS-REFERENCE TO RELATED APPLICATIONS

This application claims priority from Korean Patent Application No. 10-2016-0089436, filed on Jul. 14, 2016, in the Korean Intellectual Property Office, the disclosure of which is incorporated herein by reference in its entirety.

BACKGROUND

1. Field

Apparatuses and methods consistent with exemplary embodiments relate to an image forming apparatus and a control method of thereof, and more particularly, to an image forming apparatus which can correct color of a scan image of a document using a color characteristic of the document, and a control method of thereof.

2. Description of the Related Art

An image forming apparatus refers to an apparatus which scans an original image such as a document, a picture, or a film, and converts the image into digital data. In this case, the digital data may be displayed on a monitor of a computer or printed by a printer as an output image. Examples of such an image forming apparatus may be a scanner, a copier, a facsimile machine, or a multi function peripheral (MFP) complexly implementing the functions of the aforementioned devices through a single device.

One of the basic functions of the image forming apparatus is reading out a color image. However, there are problems that a blur or a color reproduction error occur in a read-out color image due to a color characteristic of paper. For example, a portion which looks white on real paper by the naked eyes may appear blue on an image read out by the image forming apparatus when the portion has a strong blue characteristic.

In particular, when an output of color copying is color copied again, the above-described problem becomes more serious since the blur and the color reproduction error are accumulated.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image forming apparatus which can correct color of a scan image of a document using a color characteristic of the document, and a control method of thereof.

According to an aspect of an exemplary embodiment, there is provided an image forming apparatus including: a scanner configured to generate a scanned image by scanning a document; a processor configured to generate color information of a medium representing content of the document using a predetermined area of the scanned image, and to gamma-correct a color of an entire area of the scan image based on the generated color information; and a printer configured to print the gamma-corrected scanned image.

The image forming apparatus may further include a display configured to display a user interface (UI) element for setting a white color range.

According to an aspect of an exemplary embodiment, provided a white color range being set through the UI element, the processor may be configured to gamma-correct the color of the entire area of the scan image based on the paper color information of the document according to a result of determining whether color corresponding to the paper color information of the document falls within the set white color range or not.

According to an embodiment, provided the color corresponding to the paper color information of the document not falling within the set white color range, the processor may be configured to gamma-correct the color of the entire area of the scan image according to pre-stored first gamma data, and, provided the color corresponding to the paper color information of the document falling within the set white color range, the processor may be configured to gamma-correct the color of the entire area of the scan image according to second gamma data which is generated by correcting the first gamma data based on the paper color information of the document.

The UI element may include a UI element for selecting a color range and a UI element for selecting a brightness range.

The image forming apparatus may further include a display configured to display a UI element for selecting whether to correct colored paper.

In response to correction of colored paper being selected through the UI element, the processor may be configured to gamma-correct the color of the entire area of the scan image based on the paper color information of the document even when color corresponding to the paper color information of the document falls out of a predetermined white color range.

The image forming apparatus may further include a display configured to display a first preview image which is a result of gamma-correcting the color of the entire area of the scan image according to a pre-stored first gamma, and to display a second preview image which is a result of gamma-correcting the color of the entire area of the scan image according to a second gamma which is generated by correcting the first gamma based on the paper color information of the document.

The display may be configured to further display a correction graph corresponding to the first gamma and a correction graph corresponding to the second gamma.

The image forming apparatus may further include a display configured to display a UI element for selecting one of a correction criterion of using a minimum value, a correction criterion of using a maximum value, and a correction criterion of using a median value.

In response to one of the correction criterion of using the minimum value, the correction criterion of using the maximum value, and the correction criterion of using the median value being selected through the UI element, the processor may be configured to select a minimum value, a maximum value, or a median value of a red (R) value, a green (G) value, and a blue (B) value of the color corresponding to the paper color information of the document according to the selected correction criterion, and to gamma-correct the entire area of the scan image based on a compensation value which makes the other values equal to the selected value.

The processor may be configured to apply a predetermine weight value to the compensation value and to gamma-correct the entire area of the scan image based on the compensation value to which the weight value is applied.

The display may be configured to further display a UI element for setting a weight value to be applied to the compensation value.

The scanner may be configured to generate a plurality of scan images by scanning a plurality of documents respectively, and the processor may be configured to generate a plurality of pieces of paper color information of the plurality of documents respectively using predetermined areas of the plurality of scan images, and to gamma-correct the entire areas of the plurality of scan images based on the plurality of pieces of paper color information.

The scanner may be configured to generate block images from a leading end of the document on a predetermined basis in phases, and the processor may be configured to generate paper color information of the document from a block image corresponding to the leading end, to gamma-correct the block images subsequently generated based on the paper color information of the document, and to generate a gamma-corrected scan image by combining the gamma-corrected block images.

According to an aspect of another exemplary embodiment, there is provided a control method of an image forming apparatus, including: generating a scanned image by scanning a document; generating color information of a medium representing content of the document using a predetermined area of the scanned image; gamma-correcting a color of an entire area of the scanned image based on the paper color information of the document; and printing the gamma-corrected scanned image.

The control method may further include displaying a UI element for setting a white color range.

The gamma-correcting mat include, in response to a white color range being set through the UI element, gamma-correcting the color of the entire area of the scan image based on the paper color information of the document according to a result of determining whether color corresponding to the paper color information of the document falls within the set white color range or not.

The gamma-correcting may include, in response to the color corresponding to the paper color information of the document not falling within the set white color range, gamma-correcting the color of the entire area of the scan image according to pre-stored first gamma data, and, in response to the color corresponding to the paper color information of the document falling within the set white color range, gamma-correcting the color of the entire area of the scan image according to second gamma data which is generated by applying the paper color information of the document to the first gamma data.

The UI element may include a UI element for selecting a color range and a UI element for selecting a brightness range.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
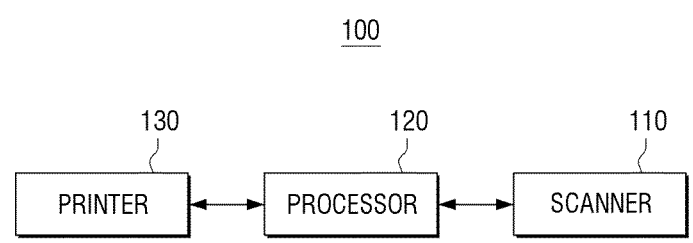
FIG. 1 is a block diagram to illustrate a configuration of an image forming apparatus according to an exemplary embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

When an element is "connected with/to" another element, the element may be directly connected with/to another element, and there may be an intervening element between the element and another element.

An "image forming job" recited herein refers to various jobs related to images (for example, printing, scanning, or faxing) such as forming an image or generating/storing/transmitting an image file, and the "job" recited herein refers to not only an image forming job but also a series of processes necessary for performing the image forming job.

In addition, an "image forming apparatus" recited herein refers to an apparatus which prints printing data generated in a terminal device such as a computer on recording paper. Examples of the image forming apparatus may be a copier, a printer, a facsimile machine, or an MFP complexly implementing the functions of the aforementioned devices through a single device. The image forming apparatus refers to all types of apparatuses which can perform the image forming job, such as a printer, a scanner, a facsimile machine, an MFP, or a display apparatus.

In addition, "hard copy" refers to an operation of outputting an image on a printing medium such as paper, or any other medium on which information may be printed, and "soft copy" refers to an operation of outputting an image through a display apparatus such as a TV or a monitor. While color information of paper is described herein, the present invention is not limited to color information of paper and may include color information of any other medium, object and/or substance on which information is printed or represented.

In addition, a "content" refers to all kinds of data which are targets of the image forming job such as a photo, an image, or a document file. Further, a "document" refers to any kind of data that is a target of the image forming job such as but not limited to text, graphics, image, or any other representation of information.

In addition, "printing data" refers to data which is converted to a printable format in a printer. When the printer supports direct printing, a file may be printing data.

In addition, a "scan image" refers to a file which is generated by scanning an image in a scanner. However, gamma-correcting color as described herein is applicable to gamma-correcting color of content related to any of the image forming jobs discussed herein, including but not limited to color of a computer file that is a target of an image forming job.

In addition, a "user" is a person who performs operations related to the image forming job using an image forming apparatus or a device connected to the image forming apparatus in a wire or wireless manner. In addition, a "manager" may be a person who has the authority to access all functions of the image forming apparatus and a system. The "user" and the "manager" may be the same person.

FIG. 1 is a block diagram to illustrate a configuration of an image forming apparatus according to an exemplary embodiment Referring to FIG. 1, the image forming apparatus 100 according to an exemplary embodiment includes a scanner 110, a processor 120, and a printer 130.

The scanner 110 may generate scan data by scanning a document. Specifically, the scanner 110 may generate scan data by projecting light onto a document, receiving reflected light, and reading out an image recorded on the document. As an image sensor for reading out the image from the document, a charge coupled device (CCD), a contact type image sensor (CIS), or the like may be employed. The scanner 110 may have a flatbed structure in which a document is laid on a fixed location and an image is read out while an image sensor is moved, a document feed structure in which an image sensor is disposed at a fixed location and a document is fed, or a combination structure of the aforementioned structures.

The processor 120 is configured to control the overall operation of the image forming apparatus 100. The processor 120 may include a central processing unit (CPU), a random access memory (RAM), a read only memory (ROM), and a system bus. The processor 120 may include a single CPU or may be implemented by using a plurality of CPUs (or DSP, SoC, or the like).

The processor 120 may generate paper color information of the document using a predetermined area of the scanned image, and may gamma-correct the color of the entire area of the scanned image based on the paper color information of the document.

Herein, the predetermined area refers to a part of the scanned image from which the paper color of the document, that is, the characteristic of the color of the document, is easily detected. Since most of the printed documents have a margin on the leading end of the document, that is, on the border of the document, the processor 120 may generate the paper color information of the document using the border of the document. According to another exemplary embodiment, the processor 120 may detect a blank area where there is no image from the document, and generate the paper color information of the document using the blank area.

Specifically, the scanner 110 may generate block images from the leading end of the document on a predetermined basis in phases, and the processor 120 may generate the scanned image on the entire area of the document by combining all of the block images. The processor 120 may generate the paper color information of the document using the first block image corresponding to the leading end of the document.

According to an exemplary embodiment, the processor 120 may generate the paper color information of the document by converting R, G, and B values which are obtained regarding the predetermined area through the scanner 110 into a color space which is formed of Y, Cb, and Cr or lightness (L), chroma (C), and hue (H). In this case, the processor 120 may obtain a histogram of Y, Cb, and Cr values or L, C, and H values of pixels of the predetermined area, may perform pre-processing to remove a scanning noise, and may generate the paper color information of the document based on an average of the values from which the noise is removed. As described above, the processor 120 may generate a single Y, Cb, and Cr value representing the predetermined area as the paper color information of the document.

The processor 120 may gamma-correct the color of the entire area of the scanned image based on the paper color information of the document. The gamma correction refers to linearly correcting a distortion characteristic of the image sensor in the form of a gamma function.

Specifically, the image forming apparatus 100 may store a basic gamma to be used for gamma correction. The basic gamma may be called an initial gamma or an uncorrected gamma. The processor 120 may generate a corrected gamma by correcting the basic gamma based on the paper color information of the document, and may gamma-correct the color of the scanned image according to the corrected gamma.

The processor 120 may gamma-correct the color of the entire area of the scanned image based on the paper color information of the document according to a result of determining whether color corresponding to the paper color information of the document falls within a predetermined color range. Specifically, when the color corresponding to the paper color information of the document does not fall within the predetermined color range, the processor 120 may gamma-correct according to the basic gamma, and, when the color corresponding to the paper color information of the document falls within the predetermined color range, the processor 120 may gamma-correct according to the corrected gamma which is corrected from the basic gamma based on the paper color information of the document. In the following description, terms "first gamma" and "second gamma" may be used to distinguish between the basic gamma and the corrected gamma.

Herein, the predetermined color range may be a white color range. Accordingly, in response to it being determined that the color corresponding to the paper color information of the document falls within the white color range, the processor 120 may gamma-correct according to the corrected gamma which is corrected from the basic gamma, and, in response to it being determined that the color corresponding to the paper color information of the document does not fall within the white color range, the paper of the document may be determined as colored paper and the processor 120 may gamma-correct according to the basic gamma. The white color range may be set by a user.

The image forming apparatus may provide a correction function for colored paper as well as white paper. In response to such a colored paper correction function being activated, the image forming apparatus may gamma-correct according to the corrected gamma which is corrected from the basic gamma even when the color corresponding to the paper color information of the paper falls out of the predetermined color range (white color range). It may be selected whether to activate the colored paper correction function or not by the user.

The generating the corrected gamma by correcting the basic gamma will be described in detail. The processor 120 may obtain the paper color information of the document, that is, the YCbCr values, using the predetermined area of the document as described above, and may convert the YCbCr values into RGB values. In addition, the processor 120 may calculate a compensation value for making the converted R, G, and B values equal to one another to have the white color characteristic. In this case, various correction criteria may be used. For example, one of a correction criterion of using a maximum value to make the R, G, and B values equal to the maximum value, a correction criterion of using a minimum value to make the R, G, and B values equal to the minimum value, and a correction criterion of using a median value to make the R, G, and B values equal to the median value may be used. The correction criterion may be selected by the user.

The correction using the maximum value will be described in detail. The processor 120 may determine a channel having the maximum value of the R, G, and B values, and set the value of that channel to K. The processor 120 may calculate a compensation value for compensating for a difference between the K value and values of the other channels. For example, when the R value is 200, the G value is 201, and the B value is 203, the channel having the maximum value is the B channel and K is 203. In this case, the compensation value for the R channel may be 3 and the compensation value for the G channel may be 2. The processor 120 may generate a corrected gamma by correcting the basic gamma based on the calculated compensation value. That is, in the above-explained example, since the B channel has the maximum value, the corrected gamma may be generated by correcting for the R and G channels without correcting for the B channel. In this case, the correction is made using a gamma characteristic of an m-bit structure. That is, the calculated compensation value is added to a gamma ranging from 0 to $(2^m-1)$. When the value plus the compensation value exceeds the maximum value $(2^m-1)$, the value is set to $(2^m-1)$.

The correction using the minimum value will be described in detail. The processor 120 may determine a channel having the minimum value of the R, G, and B values, and set the value of that channel to K. The processor 120 may calculate a compensation value for compensating for a difference between the K value and values of the other channels. For example, when the R value is 200, the G value is 201, and the B value is 203, the channel having the minimum value is the R channel and K is 200. In this case, the compensation value for the G channel may be 1 and the compensation value for the B channel may be 3. The processor 120 may generate a corrected gamma by correcting the basic gamma based on the calculated compensation value. That is, in the above-explained example, since the R channel has the minimum value, the corrected gamma may be generated by correcting for the G and B channels without correcting for the R channel. In this case, the correction is made using the gamma characteristic of the m-bit structure. That is, the calculated compensation value is subtracted from a gamma ranging from 0 to $(2^m-1)$. When the value minus the compensation value is less than the minimum value 0, the value is set to 0.

The correction using the median value will be described in detail. The processor 120 may determine a channel having the median value of the R, G, and B values. Specifically, the processor 120 may find a channel having the maximum value or the minimum value of the R, G, and B values, and then find a channel having the maximum value or the minimum value of the other two channels and set the value of that channel to K. The processor 120 may adopt the above-described correction method using the maximum value with respect to a channel having a value smaller than the K value, and adopt the above-described correction method using the minimum value with respect to a channel having a value greater than the K value. For example, when the R value is 200, the G value is 201, and the B value is 203, the channel having the median value is the G channel and K is 201. In this case, the compensation value for the R channel may be 1 and the compensation value for the B channel may be 2. The processor 120 may generate a corrected gamma by correcting the basic gamma based on the calculated compensation value. That is, in the above-explained example, since the G channel has the median value, the corrected gamma may be generated by correcting for the R and B channels without correcting for the G channel. In this case, the correction is made using the gamma characteristic of the m-bit structure. That is, the compensation value of 1 is added to a gamma ranging from 0 to $(2^m-1)$ with respect to the R channel and the compensation value of 1 is subtracted from the gamma with respect to the B channel. When the value plus the compensation value exceeds the maximum value $(2^m-1)$, the value is set to $(2^m-1)$, and when the value minus the compensation value is less than the minimum value 0, the value is set to 0.

Figure 2:
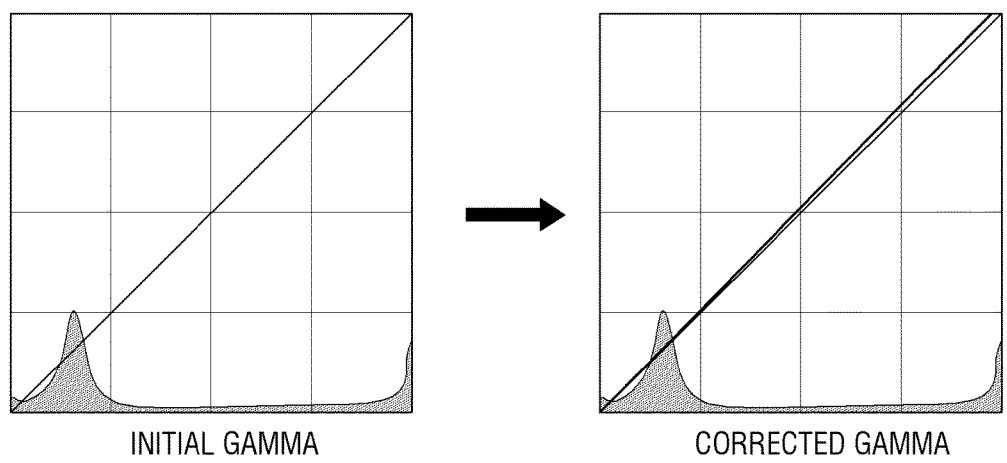
FIG. 2 is a view to illustrate a gamma corrected from a basic gamma according to an exemplary embodiment.

FIG. 2 illustrates a basic gamma (or an initial gamma) and a corrected gamma of a certain channel which is corrected through correction using a maximum value.

In the above-described correction using the maximum value, the minimum value, or the median value, the compensation value is subtracted or added as it is. However, the degree of compensation may vary by applying a weight value. That is, when the calculated compensation value is 2, the compensation value may be corrected to 1 by applying a weight value of 0.5. The weight value may be set by the user.

In addition to the correction criteria of using the maximum value, the minimum value, and the median value, a correction criterion of using an average value, which obtains an average value of the R, G, and B values and calculates a compensation value to make the R, G, and B values equal to the average value, may be used. In addition, since other correction criteria of making the R, G, and B values equal to one another may be used, the correction method is not limited to the above-described examples.

The printer 130 may form an image on recording paper in various printing methods such as electrophotography, an ink-jet method, a heat transfer method, and a thermal method. For example, the printer 130 may print an image on a recording medium by a series of processes such light exposure, developing, transferring, and fusing. The printer 130 may print the scan image which is gamma-corrected as described above.

In response to the color of the entire area of the scan image being gamma-corrected based on the corrected gamma as described above, on a part of the scan image which shows the color of the document, the blue or red characteristic disappears and the white characteristic appears. Accordingly, the blur or distortion can be reduced in a copy of the document.

In FIG. 1, the image forming apparatus 100 includes the printer 130. However, the image forming apparatus 100 may be implemented by using an image reading-out apparatus which does not include the printer 130 and includes the scanner 110 and the processor 120.

The image forming apparatus 100 may further include an additional element in addition to the elements described above in FIG. 1 and this will be described below with reference to FIG. 3.

Figure 3:
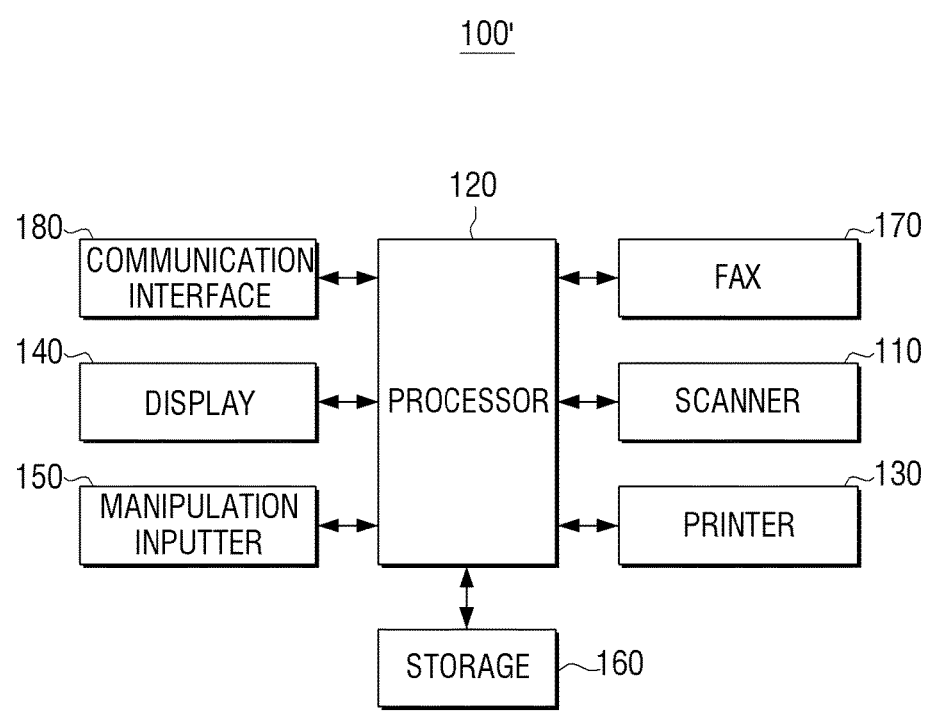
FIG. 3 is a block diagram to illustrate a configuration of an image forming apparatus according to another exemplary embodiment.

FIG. 3 is a block diagram to illustrate an image forming apparatus 100' according to an exemplary embodiment.

Referring to FIG. 3, the image forming apparatus 100' includes a scanner 110, a fax 170, a printer 130, a communication interface 180, a display 140, a manipulation inputter 150, a storage 160, and a processor 120. The same elements as the elements of the image forming apparatus 100 described with reference to FIG. 1 will not be described in detail in FIG. 3.

The scanner 110 generates a scan image by scanning a document. Specifically, the scanner 110 may include a light emitter (not shown) for emitting light to the document, a lens unit (not shown) for focusing light reflected from the document on an image sensor, and the image sensor, and may read out image information of the document from the light focused on the image sensor. The scanner 110 may be a device which scans a document laid on a flatbed or may be a device which scans one surface or both surfaces of a document fed by a duplex automatic document feeder (DADF), or may be a combination of the two devices.

The printer 130 may form an image on paper in various printing methods such as electrophotography, an ink-jet method, a heat transfer method, and a thermal method. The processor 120 may print the scan image (or scan data) or printing data through the printer 130.

According to an exemplary embodiment, the printer 130 may include a photo conductor, a charging device, a light exposure device, a developing device, a transfer device, and a fusing device. An electrostatic latent image may be formed on the photo conductor. The photo conductor may be called a photosensitive drum or a photosensitive belt according to its form. The charging device charges the surface of the photo conductor with a uniform electric potential. The charging device may be implemented in the form of a corona charging device, a charging roller, a charging brush, or the like. The light exposure device may form the electrostatic latent image on the surface of the photo conductor by changing the electric potential of the surface of the photo conductor according to image information to be printed. For example, the light exposure device may form the electrostatic latent image by projecting light which is modulated according to the image information to be printed onto the photo conductor. The light exposure device in this form may be called a light scanning device. The developing device contains a developer therein and develops the electrostatic latent image into a visible image by supplying the developer to the electrostatic latent image. The developing device may include a developing roller to supply the developer to the electrostatic latent image. The visible image formed on the photo conductor is transferred to recording paper by means of the transfer device or an intermediate transfer belt. For example, the transfer device may transfer the visible image to the recording paper by an electrostatic transfer method. The visible image is attached to the recording paper by an electrostatic attraction force. The fusing device may fuse the visible image onto the recording paper by applying heat and/or pressure to the visible image on the recording paper. Through the above-described series of processes, the printing job may be completed.

The fax 170 is configured to convert a scan file into fax data and transmit the fax data to a destination, or may be configured to receive fax data from the outside. The fax 170 may share an element for scanning a document with the scanner 110, share an element for printing a received file with the printer 130, and share an element for transmitting or receiving a file to or from the outside with the communication interface 180.

The scanner 110, the printer 130, and the fax 170 described above are elements for the image forming job, and the image forming apparatus 100' may include only some of these elements according to necessity or may further include an element for performing other kinds of image forming jobs.

The communication interface 180 is configured to communicate with an external device, and may be connected with a terminal device (not shown) such as a mobile device (a smart phone, a tablet PC), a PC, a notebook PC, a personal digital assistant (PDA), a digital camera, or the like. The communication interface 180 may receive a file and printing data from the terminal device, and the processor 120 may print the received printing data through the printer 130. In addition, the communication interface 180 may transmit a generated scan image to an external device through the scanner 110.

The communication interface 180 may be connected with an external device through a local area network (LAN) or the Internet, and also may be implemented by using a universal serial bus (USB) port. In addition, the communication interface 180 may communicate with an external device through various wireless communication methods such as IEEE, WiFi, Bluetooth, $3^{rd}$ Generation (3G), 4G, near field communication (NFC), or the like and may include various communication chips such as a WFi chip, a Bluetooth chip, an NFC chip, a wireless communication chip, or the like. The wireless communication chip refers to a chip which communicates according to various communication standards such as IEEE, Zigbee, 3G, $3^{rd}$ generation partnership project (3GPP), long term evolution (LTE), or the like.

The storage 160 may store various programs necessary for the operation of the image forming apparatus 100' and data. The storage 160 may be implemented by using a nonvolatile memory, a volatile memory, a flash memory, a hard disk drive (HDD), or a solid state drive (SSD). The storage 160 may be accessed by the processor 120, and the processor 120 may read/record/correct/delete/update data. The storage 160 may be implemented by using an internal storage medium (for example, an HDD, an SDD, or the like) of the image forming apparatus 100' or an external storage medium, for example, a removable disk including an USB memory, a web server through a network.

The storage 160 may store a basic gamma for gamma-correcting color of a scan image, and the processor 120 may gamma-correct the color of the scan image according to the basic gamma stored in the storage 160 or may gamma-correct the color of the scan image according to a corrected gamma which is corrected from the basic gamma.

The processor 120 is configured to control the overall operation of the image forming apparatus 100'. Specifically, the processor 120 may be implemented by using a central processing unit (CPU), an application specific integrated circuit (ASIC), or the like.

The display 140 may display a variety of information provided by the image forming apparatus 100'. Specifically, the display 140 may display a user interface window for selecting various functions provided by the image forming apparatus 100'. The display 140 may be a monitor which is implemented by using a liquid crystal display (LCD), a cathode ray tube (CRT), an organic light emitting diode (OLED), or the like, and may be implemented as a touch screen which performs the function of the manipulation inputter 150 simultaneously.

In particular, the display 140 may display a user interface window for setting regarding color correction.

Specifically, the display 140 may display a UI element for setting a white color range. In addition, in response to the white color range being set through the UI element for setting the white color range, the processor 120 may gamma-correct the color of the entire area of a scan image based on paper color information of a document according to a result of determining whether color corresponding to the paper color information of the document, which is generated using a predetermined area of the scan image, falls within the set white color range.

In this case, the UI element for setting the white color range may include a UI element for selecting a color range and a UI element for selecting a brightness range. In response to a color range being selected through the UI element for selecting the color range, and a brightness range being selected through the UI element for selecting the brightness range, the processor 120 may set the white color range which includes the selected color range and the selected brightness range.

In addition, the display 140 may display a UI element for selecting whether to correct colored paper or not. In addition, in response to the colored paper correction being selected through the UI element for selecting whether to correct colored paper, the processor 120 may gamma-correct the color of the entire area of the scan image based on the paper color information of the document even when the color corresponding to the paper color information of the paper falls out of the pre-set white color range.

In addition, the display 140 may display a first preview image which is a result of gamma-correcting the color of the entire area of the scan image according to a pre-stored first gamma (or a basic gamma), and a second preview image which is a result of gamma-correcting the color of the entire area of the scan image according to a second gamma (or a corrected gamma) which is corrected from the first gamma based on the paper color information of the document. In this case, the processor 120 may correct the first gamma according to user manipulation which is made through the UI element for setting the white color range and the UI element for selecting whether to correct colored paper, and accordingly, may change the second preview image and display the second preview image through the display 140.

In addition, the display 140 may display a correction graph corresponding to the first gamma and a correction graph corresponding to the second gamma.

In addition, the display 140 may display a UI element for selecting one of the correction criteria of using the minimum value, the maximum value, and the median value. In addition, in response to one of the correction criteria of using the minimum value, the maximum value, and the median value being selected through the displayed UI element, the processor 120 may select the minimum value, the maximum value, or the median value of the R, G, and B values of the color corresponding to the paper color information of the document according to the selected correction criterion, and may gamma-correct the entire area of the scan image based on a compensation value for making the other values equal to the selected value.

In addition, the display 140 may display a UI element for setting a weight value to be applied to the compensation value. In addition, the processor 120 may apply the weight value set through the UI element to the compensation value, and may gamma-correct the color of the entire area of the scan image based on the compensation value to which the weight value is applied.

The UI elements which are displayed through the display 140 will be described in detail below with reference to FIG. 4.

The manipulation inputter 150 may receive selection of a function and a control command regarding the corresponding function from the user. Herein, the function may include a printing function, a copy function, a scan function, a fax transmission function, or the like. In particular, a correction parameter related to color correction may be set through the manipulation inputter 150.

The manipulation inputter 150 may be implemented by using a plurality of buttons, a keyboard, a mouse, or the like, and may be implemented as the touch screen which performs the function of the display 140 simultaneously.

In FIG. 3, the image forming apparatus 100' includes the display 140 and the manipulation inputter 150. However, the image forming apparatus 100' may not include these elements and may be connected to an external display device and a manipulation input device through the communication interface 180. In particular, an external device may receive user manipulation for controlling the image forming apparatus 100'.

Figure 4:
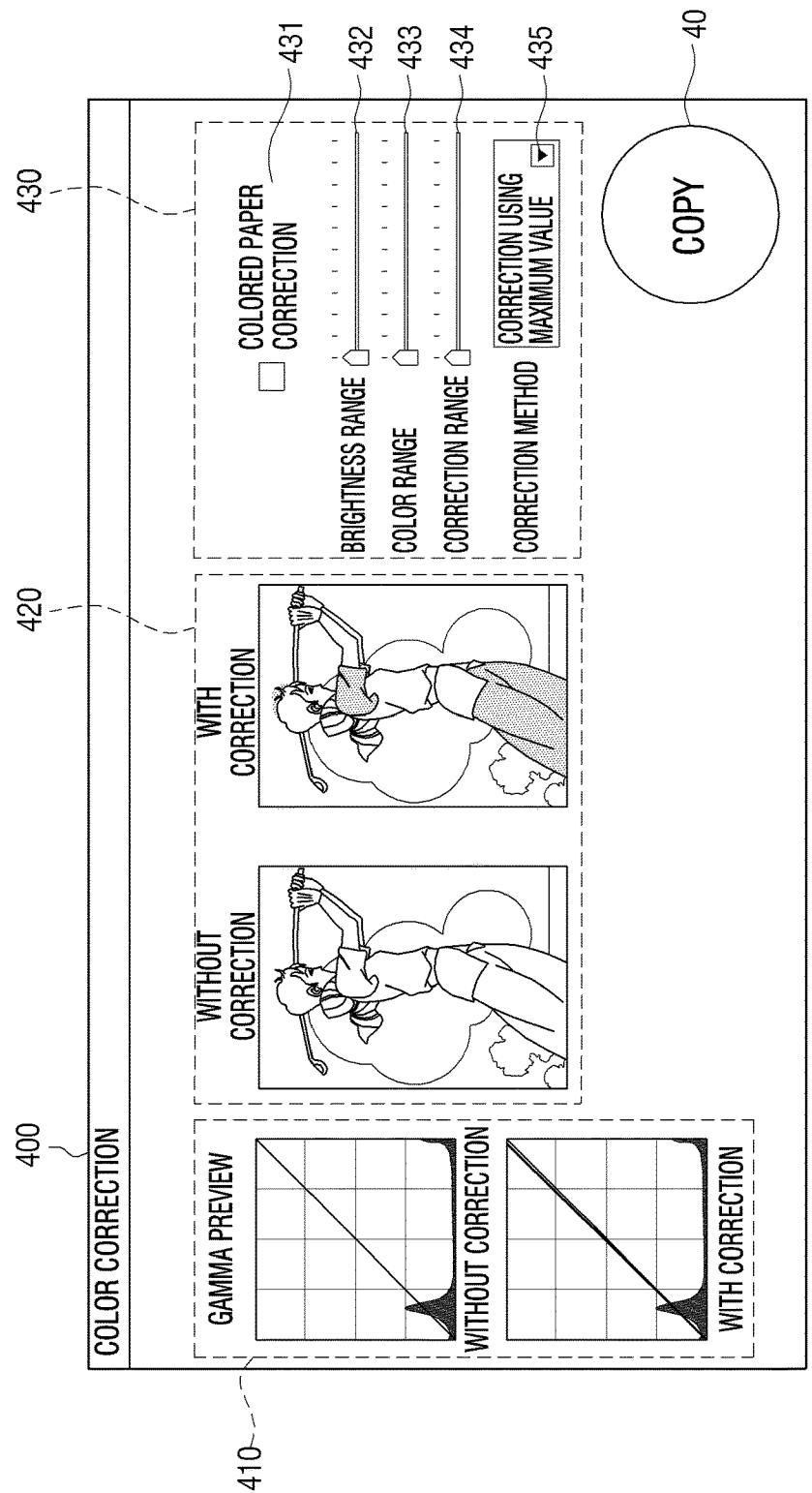
FIG. 4 is a view showing a user interface (UI) screen for setting regarding color correction according to an exemplary embodiment.

FIG. 4 is a view showing an example of a UI screen for setting a parameter related to color correction.

Referring to FIG. 4, the user interface screen 400 includes various UI elements. Specifically, the user interface screen 400 may include a gamma graph region 410, a preview region 420, a correction parameter region 430, and a copy button 40.

First, the correction parameter region 430 may include a UI element 432 for selecting a brightness range and a UI element 433 for selecting a color range as UI elements for setting a white color range. In response to the brightness range being increased through the UI element 432 for selecting the brightness range, and the color range being increased through the UI element 433 for selecting the color range, a range of color which is regarded as white increases. Likewise, in response to the brightness range being reduced through the UI element 432 for selecting the brightness range and the color range being reduced through the UI element 433 for selecting the color range, the range of the color which is regarded as white is reduced. Herein, the brightness range may correspond to a range of Y values in the YCbCr color space, and the color range may correspond to a range of CbCr values.

The processor 120 may generate paper color information of a document using a predetermined area of a scan image which is generated by scanning the document, and determine whether color corresponding to the paper color information of the document falls within the white color range set in the correction parameter region 430. In response to it being determined that the color falls within the white color range, the processor 120 may gamma-correct the color of the entire area of the scan image according to a corrected gamma which is corrected from the basic gamma based on the paper color information of the document, and, in response to it being determined that the color falls out of the white color range, the processor 120 may gamma-correct the color of the entire area of the scan image according to the basic gamma.

In response to colored paper correction being selected through a UI element 431 for selecting whether to correct colored paper, the processor 120 may gamma-correct the color of the entire area of the scan image according to the corrected gamma which is corrected from the basic gamma based on the paper color information of the document even when the color corresponding to the paper color information of the document, which is generated using the predetermined area of the scan image, falls out of the white color range. That is, in response to the colored paper correction being selected, the correction may be made according to the corrected gamma even when the document is color paper rather than white paper.

A weight value to be applied to a compensation value may be set through a UI element 434 for setting a correction range (or a UI element for setting a weight value to be applied to a compensation value) in the correction parameter region 430. Herein, the weight value may be a weight value to be applied to a compensation value which is calculated for correction using the maximum value, the minimum value, or the median value as described above.

Any one of the correction criteria of using the maximum value, the minimum value, the median value, and the average value may be selected through a UI element 435 for selecting a correction method (or a UI element for selecting a correction criterion) in the correction parameter region 430.

The preview region 420 may display and compare an image which is a result of gamma-correcting according to the basic gamma, and images which are results of gamma-correcting according to the corrected gamma which is corrected from the basic gamma. An image shown in the preview region 420 may be a certain image which is pre-stored in the storage 160. For example, the image may be a logo image of a company which manufactures the image forming apparatus 100'.

Alternatively, the image shown in the preview region 420 may be an image corresponding to a document which is actually laid on the flatbed. The processor 120 may scan the document rapidly at a low resolution in order to generate the preview image.

In addition, the processor 120 may control the display 140 to change the preview image after correction according to user manipulation in the correction parameter region 430 and display the preview image. Accordingly, the user may adjust the correction parameter as much as desired while viewing the preview image.

The gamma graph region 410 may display a graph corresponding to the basic gamma which is not corrected, and a graph corresponding to the corrected gamma. In the graph corresponding to the corrected gamma, the graph corresponding to the basic gamma without correction may further be displayed for the purpose of being compared.

In response to the copy button 40 being selected after the setting in the correction parameter region 430 is completed, the processor 120 may gamma-correct the color of the scan image according to the corrected gamma, and output the corrected scan image through the printer 130.

Although various UI elements are displayed on the single screen in FIG. 4, the UI elements may be displayed through various screens. In addition, the various UI elements described in FIG. 4 may be displayed on the display 140 provided in the image forming apparatus 100' or may be displayed on a display of an external terminal device connected with the image forming apparatus 100'.

Figure 5:
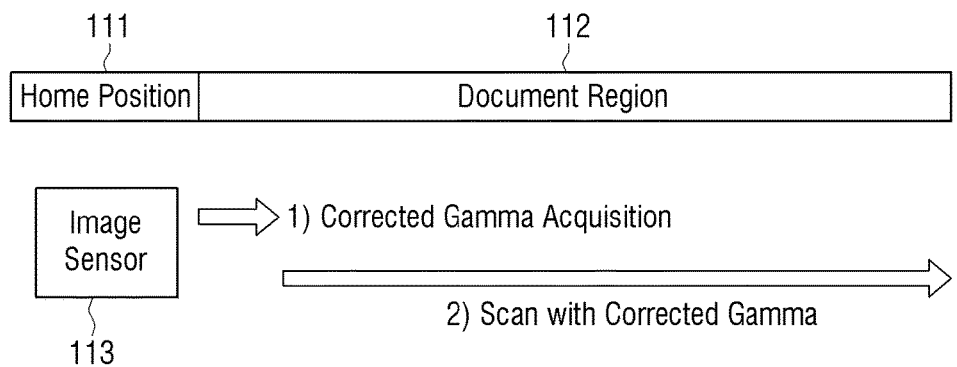
FIG. 5 is a view to illustrate a scan process of an image forming apparatus according to an exemplary embodiment.

FIG. 5 is a view to illustrate a scan process according to an exemplary embodiment.

Referring to FIG. 5, a home region 111 where an image sensor 113 is disposed when a scan job is not performed, and platen glass for example as a document region 112 where a document is laid may be formed in the flatbed of the scanner 110. In FIG. 5, the home region 111 and the document region 112 are attached to each other. However, in practice, the regions may be spaced from each other by a predetermined distance.

In response to a scan command being inputted, the image sensor 113 moves from the home region 111 to the document region 112. Accordingly, the scanner 110 generates block images from the leading end (or border) of the document laid on the document region 112 on a predetermined basis in phases.

During this process, the processor 120 may generate paper color information of the document from a block image corresponding to the leading end of the document, and acquire a corrected gamma which is corrected from the basic gamma based on the paper color information as described above (see number 1) of FIG. 5). The length of the arrow indicating the leading end of the paper in FIG. 5 is relatively long. However, in practice, the length of the arrow may be short, about 3 mm.

In addition, the processor 120 may gamma-correct the color of the block images subsequently generated using the corrected gamma (see number 2) of FIG. 5).

In addition, the processor 120 may generate a gamma-corrected scan image by combining the gamma-corrected block images, and output the generated scan image through the printer 130.

According to the above-described embodiment, since the corrected gamma is acquired in the process of scanning the leading end of the document, the corrected gamma can be utilized in the process of scanning the other areas of the document.

Figure 6:
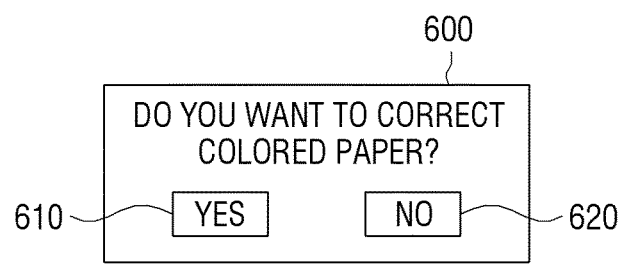
FIG. 6 is a view illustrating a UI screen for selecting whether to correct colored paper according to an exemplary embodiment.

According to the above-described embodiment, since the paper color information of the document is generated from the block image corresponding to the leading end of the document, it can be known whether the document is colored paper or not before the other areas of the document are scanned. Specifically, in response to it being determined that the paper color of the document generated by scanning the leading end of the document falls out of a predetermined white color range, that is, it being determined that the document is colored paper, the processor 120 may stop scanning and may display a UI window 600 for selecting whether to correct colored paper on the display 140 as shown in FIG. 6.

In response to a UI element 610 for selecting correction of colored paper being selected by the user through the UI window 600, the processor 120 may correct the basic gamma based on the color information of the paper generated from the leading end of the document, and resume scanning. Accordingly, the processor 120 may scan the other areas using the corrected gamma.

In response to a UI element 620 for not selecting the correction of the colored paper being selected by the user through the UI window 600, the processor 120 may resume scanning and scan the other areas using the basic gamma.

In FIG. 4, the scanning is started by selecting the correction of the colored paper through the UI element 431 for selecting whether to correct the colored paper and then selecting the copy button 40. However, according to the embodiment of FIG. 6, the user may select whether to correct the colored paper even after the scan job is started. Accordingly, since the UI window shown in FIG. 6 is provided in response to the leading end of the document being scanned even when the user has not selected the correction of the colored paper before starting the scan job, a problem that much toner is wasted can be prevented.

The UI screen which is provided in response to the leading end of the document being scanned is not limited to the form shown in FIG. 6, and a UI screen for setting more correction parameters as shown in FIG. 4 may be displayed in response to the leading end of the document being scanned.

In response to a plurality of documents being scanned, the scanner 110 may generate a plurality of scan images regarding the plurality of documents respectively, and the processor 120 may generate a plurality of pieces of paper color information of the plurality of documents using predetermined areas of the plurality of scan images, and may gamma-correct the entire areas of the plurality of scan images based on the plurality of pieces of paper color information.

In other words, since the color characteristic of each document is individually grasped and gamma correction is made, there is an effect that a different color characteristic can be corrected for each document in comparison to a case in which the plurality of scan images are gamma-corrected according to only the basic gamma. In particular, this effect may be advantageous when a copy job is performed based on a copy of an original document. This will be described below in detail with reference to FIG. 7.

Figure 7:
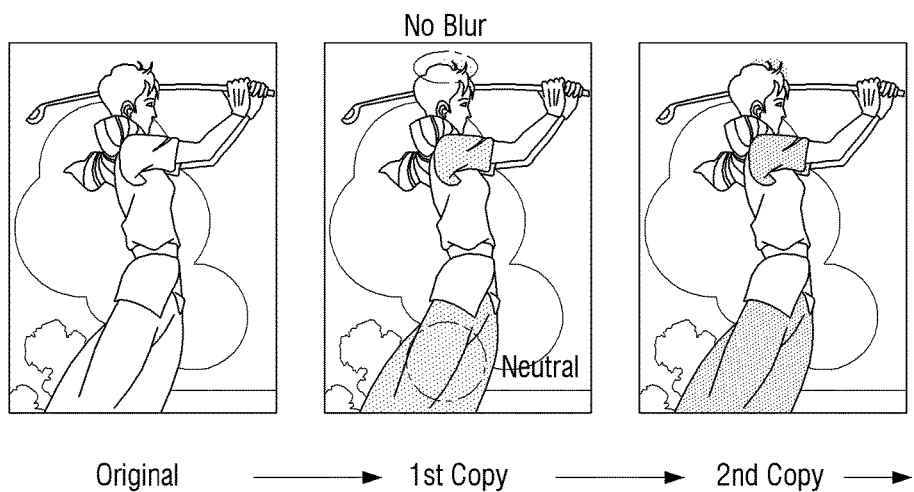
FIG. 7 is a view to illustrate printouts which are formed through an image forming apparatus according to an exemplary embodiment.
Figure 7:
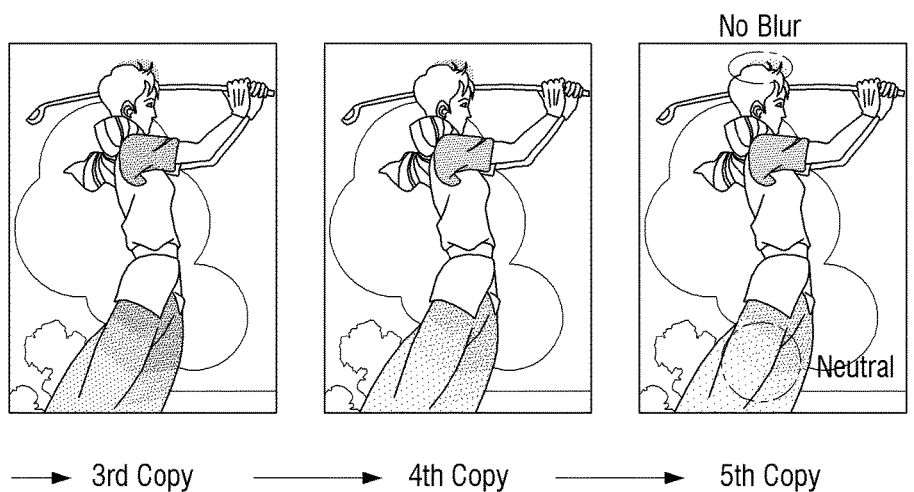

Referring to FIG. 7, in response to a command to copy an original document being inputted, the processor 120 may generate paper color information of the original document using a predetermined area of a scan image of the original document, gamma-correct the color of the entire area of the scan image based on the paper color information of the original document, and output the gamma-corrected scan image through the printer 130 as a first copy.

Thereafter, in response to a command to copy the first copy being inputted, the processor 120 may generate paper color information of the first copy using a predetermined area of a scan image of the first copy, gamma-correct the color of the entire area of the scan image based on the paper color information of the first copy, and output the gamma-corrected scan image through the printer 130 as a second copy.

In this way, the processor 120 may output a third copy, a fourth copy, a fifth copy, and so on based on a previous copy. According to the method of gamma-correcting according to a color characteristic of a document every time the document is copied, a color blur and distortion do not appear in the first copy as shown in FIG. 7, and also, in the case of a copy which has been copied many times, such as the fifth copy, the color blur and the distortion do not appear.

In the above-described embodiment, the gamma is corrected every time scanning is performed. However, by reusing the corrected gamma, a memory required to correct the gamma can be reduced. In particular, in the case of duplex scanning, a document having the same color characteristic on the front surface and the back surface is scanned. Therefore, the gamma for only one surface may be corrected and the corrected gamma may be used to scan the other surface. This embodiment will be described below in detail with reference to FIG. 8.

Figure 8:
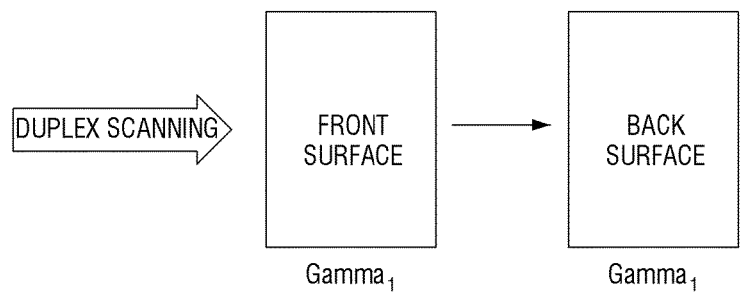
FIG. 8 is a view to illustrate color correction in duplex printing according to an exemplary embodiment.

FIG. 8 is a view to illustrate gamma correction in duplex scanning according to an exemplary embodiment.

The scanner 110 may be a device which scans both surfaces of a document fed by the DADF.

Accordingly, in response to a duplex scanning command being inputted, the processor 120 may control the scanner 110 to automatically generate a scan image corresponding to the front surface of the document and a scan image corresponding to the back surface of the document even when the user does not directly turn over the document.

In this case, in scanning the front surface first, the processor 120 may generate paper color information of the document using a predetermined area of the scan image corresponding to the front surface, and gamma-correct the color of the entire area of the scan image corresponding to the front surface according to a corrected gamma (Gamma 1 in FIG. 8) which is corrected from the basic gamma using the paper color information.

In scanning the back surface, the processor 120 may not undergo the processes such as generating paper color information and correcting the gamma, and may gamma-correct the color of the entire area of scan data corresponding to the back surface using the gamma which has been used for scanning the front surface, that is, Gamma 1, as it is.

According to the present embodiment, since the operation of correcting the gamma is performed when the front surface is scanned and the operation of correcting the gamma is not performed when the back surface is scanned using the feature that the front surface and the back surface of a single document has the same paper color characteristic, there is an effect that a scanning speed can be increased.

In addition, when different documents are scanned but it is determined that the documents have the same or similar color characteristic, the gamma which is once used to scan a previous document may be used to scan the next document.

Specifically, in scanning a first document, the processor 120 may acquire a first YCbCr value from a predetermined area of the first document, and may acquire a second YCbCr value from a predetermined area of the second document which is subsequently scanned. In addition, the processor 120 may compare the first YCbCr value and the second YCbCr value, and, in response to a different between both values being less than a predetermined value, the processor 120 may determine that the paper color characteristic of the first document and the paper color characteristic of the second document are similar to each other, and correct the color using the gamma which is used to scan the first document when scanning the second document. In response to it being determined that the difference between both values is greater than or equal to the predetermined value, the processor 120 may perform a separate operation of correcting the gamma when scanning the second document.

According to the present embodiment, since correction is made in consideration of a color characteristic of each document when the plurality of documents are scanned, a memory required to correct the gamma can be reduced.

Figure 9:
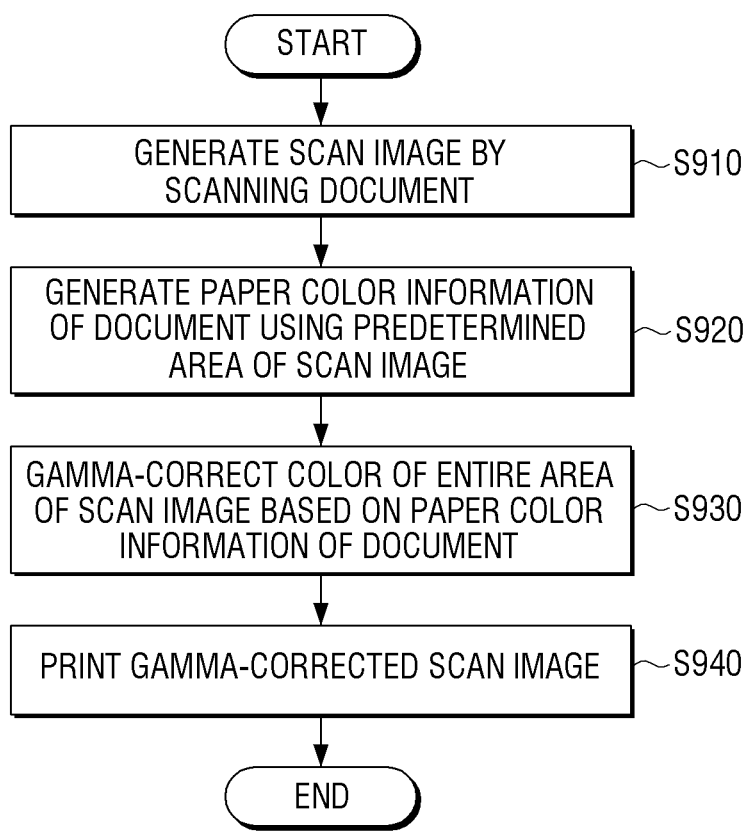
FIGS. 9 and 10 are flowcharts to illustrate a control method of an image forming apparatus according to various exemplary embodiments.

FIG. 9 is a flowchart to illustrate a control method of an image forming apparatus according to an exemplary embodiment. The control method of the image forming apparatus according to the present disclosure may include various embodiments described with reference to FIGS. 1 to 8 as well as the embodiment described with reference to FIG. 9. Accordingly, a redundant explanation is omitted.

Referring to FIG. 9, the image forming apparatus generates a scan image by scanning a document (S910).

The image forming apparatus generates paper color information of the document using a predetermined area of the scan image (S920).

Herein, the predetermined area may be a leading end (or border) of the document or a blank area.

To generate the paper color information of the document using the leading end of the document, the image sensor of the image forming apparatus may move from the home position as much as a predetermined line.

To generate the paper color information of the document using the blank area of the document, the image sensor of the image forming apparatus may scan the entire area of the document, detect the blank area from the scanned image, and use the detected blank area.

In this case, the paper color information of the document may indicate average color of the predetermined area, and may be an average value of color values of a plurality of pixels forming the predetermined area, for example, YCbCr values. In this case, since some pixels have noises, the image forming apparatus may acquire a histogram regarding the predetermined area and may remove a color value deviating from a primary color region. By calculating an average of color values from which the noise is removed as described above, the paper color information of the document may be generated.

The image forming apparatus gamma-corrects the color of the entire area of the scan image based on the paper color information of the document (S930).

Herein, the gamma-correcting the color of the entire area of the scan image based on the paper color information of the document may refer to generating a corrected gamma by correcting a gamma stored in the image forming apparatus based on the paper color information of the document, and correcting the color of the entire area according to the corrected gamma.

In this case, in response to color corresponding to the paper color information of the document not being white, the image forming apparatus may not perform the operation of correcting the basic gamma as described above and may correct the color according to the basic gamma. In this case, in response to the paper color information of the document being a YCbCr value, a Y value may be identified. In response to it being determined that the Y value is lower than a predetermined value and the paper is dark paper, the document may be determined as colored paper rather than white paper.

In addition, the image forming apparatus may print the gamma-corrected scan image (S940). In addition to printing, the image forming apparatus may store the gamma-corrected scan image as a scan file and may transmit the scan file to an external device. When the image forming apparatus is provided with a display, the gamma-corrected scan image may be displayed through the display. In addition, when the image forming apparatus is provided with a fax, the image forming apparatus may transmit the gamma-corrected scan image to an external device as fax data.

Figure 10:
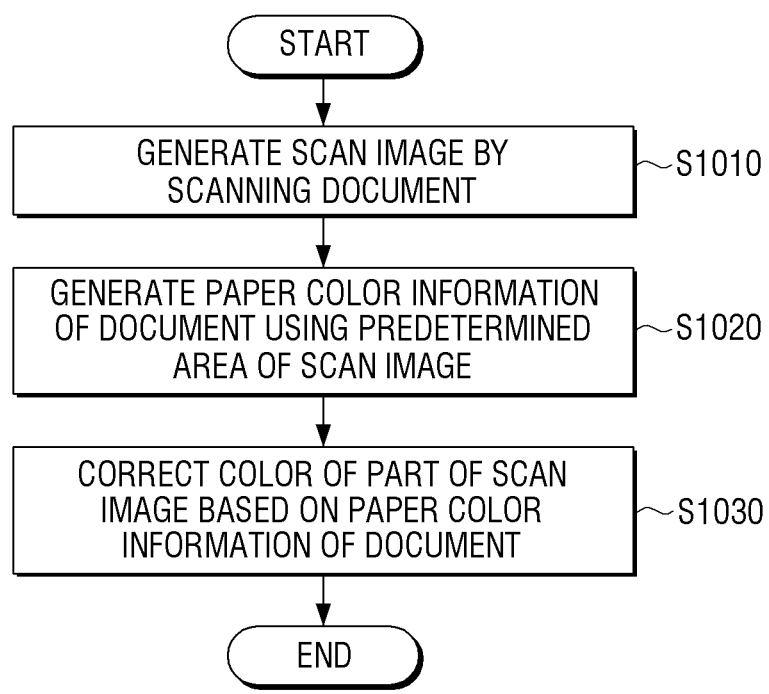

FIG. 10 is a view to illustrate a control method of an image forming apparatus according to another exemplary embodiment.

Referring to FIG. 10, the image forming apparatus generates a scan image by scanning a document (S1010). The image forming apparatus generates paper color information of the document using a predetermined area of the scan image (S1020). S1010 and S1020 correspond to S910 and S920 of FIG. 9, respectively, and thus a detailed description thereof is omitted.

In addition, the image forming apparatus corrects the color of some areas of the scan image based on the paper color information of the document (S1030).

In this case, some areas may be a blank area. Specifically, the image forming apparatus may divide the scan image corresponding to the entire area into blocks of a predetermined size, and may generate color characteristic information of each block and determine whether each block is a blank area or not.

In addition, the image forming apparatus may acquire RGB values of color corresponding to the paper color information of the document generated using the predetermined area, and calculate a compensation value for making the RGB values equal to one another. For example, the image forming apparatus may calculate the compensation value according to one of the correction criteria of using the minimum value, the maximum value, and the median value as described above.

In addition, some areas, for example, the blank area may be corrected to have a white color characteristic by applying the calculated compensation value to the blank area. For example, in response to the R channel being a channel having a maximum value according to the correction method of using the maximum value, the blank area may be corrected to have the white color characteristic by adding the compensation values to the value of the G channel and the value of the R channel of each blank area.

As described above, it is possible to correct the color of some areas of the scan image based on the color characteristic of the document. That is, as in the embodiments described with reference to FIGS. 1 to 9, it is possible to correct the color of the "entire" area of the scan image using the color characteristic of the predetermined area of the scan image, and also, as explained in FIG. 11, it is possible to correct "some" areas of the scan image using the color characteristic of the predetermined area of the scan image.

In addition, the image forming apparatus may perform jobs such as printing the gamma-corrected scan image of some areas, generating scan data and transmitting it to an external device, and transmitting the scan image to an external device as fax data.

The above-described various embodiments may be implemented in a recording medium which is readable by a computer or a similar device using software, hardware, or a combination of these. According to hardware implementation, the embodiments described in the present disclosure may be implemented by using at least one of ASICs, digital signal processors (DSPs), digital signal processing devices (DSPDs), programmable logic devices (PLDs), field programmable gate arrays (FPGAs), processors, controllers, micro controllers, microprocessors, and an electric unit for performing other functions. In some cases, the embodiments described in the present disclosure may be implemented by using the processor 120. According to software implementation, the embodiments of the procedure and the functions described in the present disclosure may be implemented by using separate software modules. Each of the software modules may perform one or more functions and one or more operations described in the present disclosure.

The control method of the electronic device according to the above-described various exemplary embodiments may be stored in a non-transitory readable medium. The non-transitory readable medium may be mounted in various devices and used.

The non-transitory readable medium refers to a medium that stores data semi-permanently rather than storing data for a very short time, such as a register, a cache, a memory or etc., and is readable by an apparatus. Specifically, programs for performing the above-described various methods may be stored in the non-transitory readable medium such as a compact disc (CD), a digital versatile disk (DVD), a hard disk, a Blu-ray disk, a universal serial bus (USB), a memory card, a ROM or etc., and may be provided The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image forming apparatus comprising:
a scanner to generate a scanned image of an image formed on a medium by scanning the medium;
a processor to,
generate color information of a color of the medium using a determined area of the scanned image,
perform a determination of whether the color of the medium is within or outside a white color range based on a settable color range and/or a settable brightness range, and
perform a first or a second gamma-correction of a color of an entire area of the scanned image based on the color of the medium, in response to the determination of whether the color of the medium is within or outside the white color range,
wherein,
provided the color of the medium is outside the white color range according to the determination, the processor is to perform the first gamma-correction of the color of the entire area of the scanned image according to stored first gamma data, and
provided the color of the medium is within the white color range according to the determination, the processor is to perform the second gamma-correction of the color of the entire area of the scanned image according to second gamma data which is generated by correcting the stored first gamma data based on the generated color information of the color of the medium; and
a printer to print the gamma-corrected scanned image.

2. The image forming apparatus of claim 1, further comprising:
a display to display a user interface (UI) element to set the white color range.

3. The image forming apparatus of claim 2, wherein,
the UI element comprises a first UI element to set the color range and a second UI element to set the brightness range.

4. The image forming apparatus of claim 1, wherein the medium is a colored paper, and
the image forming apparatus further comprises a display to display a UI element for selecting whether to perform a color correction according to the color of the colored paper.

5. The image forming apparatus of claim 4, wherein, provided the color correction the colored paper is selected through the UI element, the processor is to gamma-correct the color of the entire area of the scanned image based on the generated color information of the color of the medium even when a color corresponding to the generated color information of the color of the medium is outside the white color range.

6. The image forming apparatus of claim 1, further comprising:
a display to display a first preview image which is a result of gamma-correcting the color of the entire area of the scanned image according to a stored first gamma, and to display a second preview image which is a result of gamma-correcting the color of the entire area of the scanned image according to a second gamma which is generated by correcting the stored first gamma based on the generated color information of the color of the medium.

7. The image forming apparatus of claim 6, wherein the display is to further display a correction graph corresponding to the stored first gamma and a correction graph corresponding to the second gamma.

8. The image forming apparatus of claim 1, further comprising:
a display to display a UI element for selecting one of a correction criterion of using a minimum value, a correction criterion of using a maximum value, and a correction criterion of using a median value, to gamma-correct the color of the entire area of the scanned image.

9. The image forming apparatus of claim 8, wherein, provided one of the correction criterion of using the minimum value, the correction criterion of using the maximum value, and the correction criterion of using the median value is selected through the UI element, the processor is to select a minimum value, a maximum value, or a median value of a red (R) value, a green (G) value, and a blue (B) value of the color corresponding to the generated color information of the color of the medium according to the selected correction criterion, and to gamma-correct the entire area of the scanned image based on a compensation value which makes the other values equal to the selected value.

10. The image forming apparatus of claim 9, wherein the processor is to apply a determined weight value to the compensation value and to gamma-correct the entire area of the scanned image based on the compensation value to which the weight value is applied.

11. The image forming apparatus of claim 10, wherein the display is to further display a UI element for setting a weight value to be applied to the compensation value.

12. The image forming apparatus of claim 1, wherein the scanner is to generate a plurality of scanned images by scanning a plurality of media, respectively, and
wherein the processor is to generate color information of a color of a corresponding medium, respectively, using corresponding determined areas of the plurality of scanned images, and to gamma-correct entire areas of the plurality of scanned images based on the plurality of color information of the color of the media corresponding to the determined areas.

13. The image forming apparatus of claim 1, wherein the scanner is to generate block images from a leading end of the medium on a predetermined basis in phases, and wherein the processor is to generate color information of the color of the medium from a block image corresponding to the leading end, to gamma-correct the block images subsequently generated based on the color information of the color of the medium, and to generate a gamma-corrected scanned image by combining the gamma-corrected block images.

14. A control method of an image forming apparatus, comprising:

generating a scanned image by scanning a medium on which an image is formed;

generating color information of a color of the medium using a determined area of the scanned image;

determining whether the color of the medium is within or outside a white color range based on a settable color range and/or a settable brightness range; and performing a first or a second gamma-correction of a color of an entire area of the scanned image based on the color of the medium, in response to the determining whether the color of the medium is within or outside the white color range, to print the gamma-corrected scanned image, wherein provided the color of the medium is outside the white color range according to the determining, perform the first gamma-correction of the color of the entire area of the scanned image according to pre-stored first gamma data, and provided the color of the medium is within the white color range according to the determining, perform the second gamma-correction of the color of the entire area of the scanned image according to second gamma data which is generated by applying the generated color information of the color of the medium to the first gamma data.

15. The control method of claim 14, further comprising: displaying a user interface (UI) element to set the white color range.

16. The control method of claim 15, wherein the displayed UI element comprises a first UI element to set the color range, and a second UI element to set the brightness range.

* * * * *